(12) United States Patent
Shin et al.

(10) Patent No.: US 9,490,500 B2
(45) Date of Patent: Nov. 8, 2016

(54) OXIDE-BASED SOLID ELECTROLYTE AND METHOD OF PREPARING THE SAME

(71) Applicant: Electronics and Telecommunications Research Institute, Daejeon (KR)

(72) Inventors: Dong Ok Shin, Daejeon (KR); Young-Gi Lee, Daejeon (KR); Kunyoung Kang, Daejeon (KR); Kwang Man Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 111 days.

(21) Appl. No.: 14/608,906

(22) Filed: Jan. 29, 2015

(65) Prior Publication Data

US 2015/0349376 A1 Dec. 3, 2015

(30) Foreign Application Priority Data

May 28, 2014 (KR) .................. 10-2014-0064564

(51) Int. Cl.
*H01M 10/0562* (2010.01)
*H01M 10/0525* (2010.01)
(Continued)

(52) U.S. Cl.
CPC ........ *H01M 10/0562* (2013.01); *C01G 25/006* (2013.01); *C01G 33/006* (2013.01); *C01G 35/006* (2013.01); *C04B 35/486* (2013.01); *C04B 35/495* (2013.01); *H01B 1/122* (2013.01); *H01M 10/052* (2013.01); *C01P 2002/52* (2013.01); *C01P 2002/72* (2013.01);
(Continued)

(58) Field of Classification Search
CPC ................ H01M 2300/0071; H01M 10/0562; H01M 10/0525
See application file for complete search history.

(56) References Cited

U.S. PATENT DOCUMENTS 6,908,708 B2 6/2005 Wu et al.
7,008,608 B2 3/2006 Park et al.
(Continued)

FOREIGN PATENT DOCUMENTS

KR 10-2010-0053543 A 5/2010
KR 10-2012-0039447 A 4/2012

OTHER PUBLICATIONS

I. Kokal et al., "Sol-gel synthesis and lithium ion conductivity of $Li_7La_3Zr_2O_{12}$ with garnet-related type structure", Solid State Ionics, 2011, pp. 42-46, vol. 185.
(Continued)

*Primary Examiner* — Stewart Fraser
(74) *Attorney, Agent, or Firm* — Rabin & Berdo, P.C.

(57) ABSTRACT

An oxide-based solid electrolyte according to the present invention may be $Li_xLa_3M_2O_{12}$ and may have a cubic phase. The oxide-based solid electrolyte may further include first and second dopants. A method of preparing an oxide-based solid electrolyte according to the concept of the present invention may include mixing a lithium compound, a lanthanum compound, a metal compound, a first dopant precursor, and a second dopant precursor to prepare an intermediate, and crystallizing the intermediate to prepare $Li_xLa_3M_2O_{12}$ crystals having a cubic phase.

12 Claims, 7 Drawing Sheets

(51) Int. Cl.
*H01M 10/052* (2010.01)
*H01B 1/12* (2006.01)
*C04B 35/486* (2006.01)
*C04B 35/495* (2006.01)
*C01G 25/00* (2006.01)
*C01G 33/00* (2006.01)
*C01G 35/00* (2006.01)

(52) U.S. Cl.
CPC ........ *C01P2002/76* (2013.01); *C01P 2006/40* (2013.01); *C04B 2235/3203* (2013.01); *C04B 2235/3217* (2013.01); *C04B 2235/3227* (2013.01); *C04B 2235/3244* (2013.01); *C04B 2235/3251* (2013.01); *C04B 2235/3284* (2013.01); *C04B 2235/3287* (2013.01); *C04B 2235/3293* (2013.01); *C04B 2235/3294* (2013.01); *C04B 2235/3418* (2013.01); *C04B 2235/762* (2013.01); *C04B 2235/81* (2013.01); *H01M 2300/0071* (2013.01); *Y02E 60/122* (2013.01)

(56) References Cited

U.S. PATENT DOCUMENTS

2010/0203383 A1  8/2010  Weppner
2014/0154586 A1* 6/2014  Hayashi ............. H01M 10/052
                                                    429/322
2015/0010829 A1* 1/2015  Shin .................. H01M 10/0562
                                                    429/305
2015/0037688 A1* 2/2015  Otsuka ............. H01M 10/0525
                                                    429/322

OTHER PUBLICATIONS

Venkataraman Thangadurai et al., "Novel Fast Lithium Ion Conduction in Garent-Type $Li_5La_3M_2O_{12}$ (M = Nb, Ta)", Journal of the American Ceramic Society, 2003, pp. 437-440, vol. 86, No. 3.

Ramaswamy Murugan et al., "Fast Lithium Ion Conduction in Garnet-Type $Li_7La_3Zr_2O_{12}$", Angew. Chem. Int. Ed., 2007, pp. 7778-7781, vol. 46.

Masashi Kotobuki et al., "Fabrication of all-solid-state lithium battery with lithium metal anode using $Al_2O_3$-added $Li_7La_3Zr_2O_{12}$ solid electrolyte", Journal of Power Sources, Apr. 29, 2011, pp. 7750-7754, vol. 199.

Mian Huang et al., "Effect of Si, In and Ge doping on high ionic conductivity of $Li_7La_3Zr_2O_{12}$", Electrochemistry Communications, May 18, 2012, pp. 62-64, vol. 21.

Ying Jin et al., "Al-doped $Li_7La_3Zr_2O_{12}$ synthesized by a polymerized complex method", Journal of Power Sources, May 31, 2011, 8683-8687, vol. 196.

* cited by examiner

OXIDE-BASED SOLID ELECTROLYTE AND METHOD OF PREPARING THE SAME

CROSS-REFERENCE TO RELATED APPLICATIONS

This U.S. non-provisional patent application claims priority under 35 U.S.C. §119 of Korean Patent Application No. 10-2014-0064564, filed on May 28, 2014, the entire contents of which are hereby incorporated by reference.

BACKGROUND

The present invention disclosed herein relates to lithium batteries, and more particularly, to oxide-based solid electrolytes and the preparation thereof.

Interests in lithium batteries have significantly grown as the importance of energy storage and conversion technologies has increased. Lithium batteries may include an anode, a separator, a cathode, and an electrolyte. The electrolyte functions as a medium in which ions may move between the cathode and the anode. Since energy densities of the lithium batteries may be relatively higher than those of other types of batteries and miniaturization and weight reduction of the lithium batteries may be possible, research and development of lithium batteries as power sources of portable electronic devices have been actively conducted. Recently, in line with the improvement of the performance of the portable electronic devices, power consumed in the portable electronic devices has increased. Lithium batteries are required to generate high power. As a result, a lithium battery electrolyte is required to have high ionic conductivity and low electrical conductivity.

The lithium battery electrolyte may include an organic liquid electrolyte and an inorganic solid electrolyte. The organic liquid electrolyte contains a lithium salt dissolved therein and is widely used due to high ionic conductivity and stable electrochemical properties. However, many issues related to the safety of the organic liquid electrolyte have been raised due to its flammability, volatility, and leakage problem. Lithium batteries including the inorganic solid electrolyte may have freedom of cell design. Also, the inorganic solid electrolyte may have excellent stability because fire and explosion due to a decomposition reaction of an electrolyte solution may be prevented.

SUMMARY

The present invention provides a method of preparing an oxide-based solid electrolyte having high purity and high ionic conductivity.

The object of the present invention is not limited to the aforesaid, but other objects not described herein will be clearly understood by those skilled in the art from descriptions below.

Embodiments of the present invention provide methods of preparing an oxide-based solid electrolyte including: mixing a lithium compound, a lanthanum compound, a metal compound, a first dopant precursor, and a second dopant precursor to prepare an intermediate; and crystallizing the intermediate to prepare $Li_xLa_3M_2O_{12}$ crystals having a cubic phase (where x is 5 or 7, and M is any one selected from the group consisting of tantalum, niobium, and zirconium).

In some embodiments, the first dopant precursor is a salt including a first dopant, and the first dopant may include any one selected form the group consisting of aluminum, germanium, silicon, gallium, indium, tin, and antimony.

In other embodiments, the first dopant precursor may be added to the intermediate so that the first dopant is present in a stoichiometric amount of 0.82 mol % to 1.64 mol % based on the $Li_xLa_3M_2O_{12}$ crystals.

In still other embodiments, the second dopant may include any one selected from the group consisting of tantalum, niobium, and zirconium, wherein the second dopant may include a material that is different from a metal included in the metal compound.

In even other embodiments, the second dopant precursor may be added to the intermediate so that the second dopant is present in a stoichiometric amount of 0.41 mol % to 0.82 mol % based on the $Li_xLa_3M_2O_{12}$ crystals.

In yet other embodiments, the crystallizing of the intermediate may include not forming $Li_xLa_3M_2O_{12}$ having a tetragonal phase and a material different from the $Li_xLa_3M_2O_{12}$.

In further embodiments, the crystallizing of the intermediate may include heat treating the intermediate in a temperature range of 800° C. to 1,000° C. for 3 hours to 4 hours.

In still further embodiments, M is zirconium, and the preparing of the intermediate may include providing the lithium compound so that lithium included in the lithium compound is in an amount greater than 27.7 mol % and less than 30.9 mol % based on the $Li_xLa_3M_2O_{12}$ crystals.

In even further embodiments, M is tantalum, and the preparing of the intermediate may include providing the lithium compound so that lithium included in the lithium compound is in an amount greater than 26.8 mol % and less than 27.7 mol % based on the $Li_xLa_3M_2O_{12}$ crystals.

In other embodiments of the present invention, oxide-based solid electrolytes include $Li_xLa_3M_2O_{12}$ crystals having a cubic phase; a first dopant included in the $Li_xLa_3M_2O_{12}$ crystals; and a second dopant included in the $Li_xLa_3M_2O_{12}$ crystals, wherein the first dopant is included in an amount of 0.82 mol % to 1.64 mol % based on the $Li_xLa_3M_2O_{12}$ crystals, and the second dopant is included in an amount of 0.41 mol % to 0.82 mol % based on the $Li_xLa_3M_2O_{12}$ crystals (where x is 5 or 7, and M is any one selected from the group consisting of tantalum, niobium, and zirconium).

In some embodiments, the first dopant may include any one selected form the group consisting of aluminum, germanium, silicon, gallium, indium, tin, and antimony.

In other embodiments, the second dopant may include any one selected from the group consisting of tantalum, niobium, and zirconium, wherein the second dopant may include a material that is different from M of the $Li_xLa_3M_2O_{12}$ crystals.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE EMBODIMENTS

Preferred embodiments of the present invention will be described below in more detail with reference to the accompanying drawings in order to fully understand the constitution and effect of the present invention. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Those skilled in the art will understand that the present inventive concept can be implemented in an appropriate environment.

Advantages and features of the present invention, and implementation methods thereof will be clarified through following embodiments described with reference to the accompanying drawings. The present invention may, however, be embodied in different forms and should not be construed as limited to the embodiments set forth herein. An embodiment described and exemplified herein includes a complementary embodiment thereof. Rather, these embodiments are provided so that this disclosure will be thorough and complete, and will fully convey the scope of the present invention to those skilled in the art. Further, the present invention is only defined by scopes of claims. Like reference numerals denote like elements throughout the specification.

In the following description, the technical terms are used only for explaining a specific exemplary embodiment while not limiting the present invention. The terms of a singular form may include plural forms unless referred to the contrary. The meaning of "comprises" and/or "comprising" specifies a property, a region, a fixed number, a step, a process, an element and/or a component but does not exclude other properties, regions, fixed numbers, steps, processes, elements and/or components.

Unless otherwise defined, all terms used herein have the same meaning as commonly understood by one of ordinary skill in the art to which this inventive concept belongs.

Figure 1:
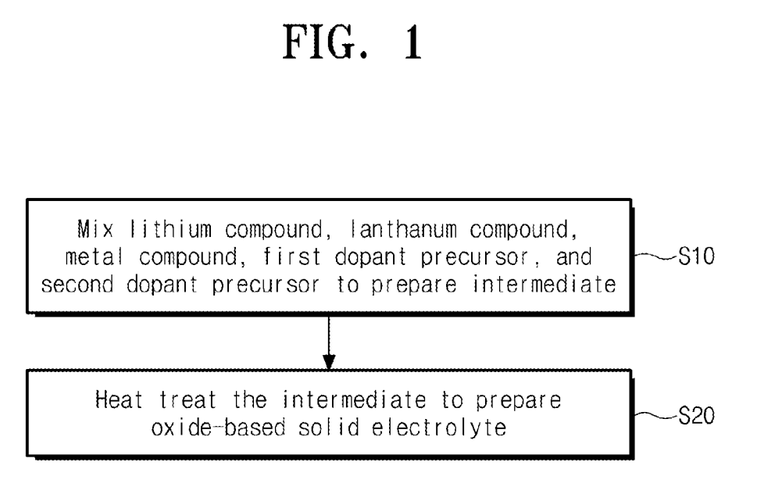
FIG. 1 is a flowchart illustrating a method of preparing an oxide-based solid electrolyte according to an embodiment of the present invention.

FIG. 1 is a flowchart illustrating a method of preparing an oxide-based solid electrolyte according to an embodiment of the present invention.

Referring to FIG. 1, a lithium compound, a lanthanum compound, a metal compound, a first dopant precursor, and a second dopant precursor may be prepared (S10). In this case, amounts of the lanthanum compound and the metal compound added may be adjusted so that lanthanum included in the lanthanum compound and a metal included in the meal compound have a stoichiometric ratio of 3:2.

The lanthanum compound may include lanthanum oxide ($La_2O_3$), lanthanum nitrate hexahydrate ($La(NO_3)_3.6H_2O$), lanthanum chloride ($LaCl_3$), lanthanum acetate hydrate ($La(CH_3CO_2)_3.xH_2O$), lanthanum chloride heptahydrate ($LaCl_3.7H_2O$), lanthanum nitrate hydrate ($La(NO_3)_3.xH_2O$), lanthanum chloride hydrate ($LaCl_3.xH_2O$), lanthanum carbonate hydrate ($La(CO_3)_3.xH_2O$), and lanthanum hydroxide ($La(OH)_3$). In order to prevent the introduction of impurities, the lanthanum compound may not include a metal other than lanthanum.

The metal compound may include a metal having the same or similar size (e.g., atomic radius) to a lithium atom. The metal may be a tetravalent or pentavalent metal element. The metal compound may include any one metal selected from the group consisting of zirconium, niobium, and tantalum. The metal compound may be a metal in the form of acetate, nitrate, chloride, hydroxide, or oxide. For example, the metal compound may be a zirconium compound such as zirconium oxide ($ZrO_2$), zirconium chloride ($ZrCl_4$), zirconium oxynitrate hydrate ($ZrO(NO_3)_2.xH_2O$), or zirconium nitride (ZrN). As another example, the metal compound may be a tantalum compound such as tantalum oxide ($Ta_2O_5$), tantalum chloride ($TaCl_5$), tantalum methoxide ($Ta(OCH_3)_5$), or tantalum ethoxide ($Ta(OC_2H_5)_5$). As another example, the metal compound may be a niobium compound such as niobium oxide (e.g., $Nb_2O_5$ or $NbO_2$), niobium chloride ($NbCl_5$), or niobium nitride (NbN). In this case, a metal compound having high purity may be used.

In the case that the metal compound is a zirconium compound, a lithium compound may be provided so that a lithium element in the lithium compound is included in an amount greater than 27.7 mol % and less than 30.9 mol % based on $Li_xLa_3M_2O_{12}$ as a final product. In the case in which the metal compound is a tantalum compound, a lithium compound may be provided so that a lithium element in the lithium compound is included in an amount greater than 26.8 mol % and less than 27.7 mol % based on $Li_xLa_3M_2O_{12}$ as a final product. The lithium compound may include lithium carbonate ($LiCO_3$), lithium chloride (LiCl), lithium hydroxide (LiOH), lithium acetate ($CH_3COOLi$), lithium perchlorate ($LiClO_4$), lithium nitrate ($LiNO_3$), lithium oxide ($Li_2O$), or lithium peroxide (LiOOLi). In order to prevent the introduction of impurities, the lithium compound may not include a metal other than lithium.

The first dopant precursor may include an atom having the same or similar size (e.g., atomic radius) to a lithium atom. Herein, the term "dopant" denotes a material which may improve the performance of the final product while not changing a structure of the final product. The first dopant precursor may be a salt including a first dopant. The first dopant precursor may be acetate, nitrate, chloride, hydroxide, or oxide. The first dopant may include any one element selected form the group consisting of aluminum, germanium, silicon, gallium, indium, tin, and antimony. In order to prevent the introduction of impurities, the first dopant precursor may not include other metals or semi-metallic materials other than the any one element. The first dopant precursor may be provided so that an amount of the first dopant is in a range of 0.82 mol % to 1.64 mol % base on $Li_xLa_3M_2O_{12}$ as the final product.

The second dopant precursor may include any one metal selected from the group consisting of zirconium, niobium, and tantalum, wherein the second dopant precursor may include a metal that is different from the metal included in the metal compound. In order to prevent the introduction of impurities, the second dopant precursor may not include other metals or semi-metallic materials other than the any one metal. The second dopant precursor may be provided so that the amount of the first dopant is in a range of 0.82 mol % to 1.64 mol % based on $Li_xLa_3M_2O_{12}$ as the final product.

The lithium compound, the lanthanum compound, the metal compound, the first dopant precursor, and the second dopant precursor may be mixed. A mixing process of the lithium compound, the lanthanum compound, the metal compound, the first dopant precursor, and the second dopant precursor may be performed for about 12 hours to about 24 hours by mechanical mixing, for example, a ball milling method. Alcohol may be further added to the preparation materials so that the lithium compound, the lanthanum compound, the metal compound, the first dopant precursor, and the second dopant precursor are more uniformly mixed. The alcohol may be at least one alcohol selected from the group consisting of methanol, ethanol, and isopropyl alcohol. The lithium compound, the lanthanum compound, the metal compound, and the dopant compounds may be ground in the mixing process. As a result, the lithium compound, the lanthanum compound, the metal compound, and the dopant compounds may be more uniformly distributed in an intermediate. The intermediate may be provided in the form of solid powder by a drying process of the intermediate.

The intermediate may be crystallized to prepare an oxide-based solid electrolyte (S20). For example, the intermediate may be crystallized by a heat treatment process. The heat treatment of the intermediate may be performed in a reaction furnace. The oxide-based solid electrolyte may be expressed by $Li_xLa_3M_2O_{12}$ (where x is 5 or 7, and M is any one selected from the group consisting of tantalum, niobium, or zirconium). The oxide-based solid electrolyte may have a cubic phase and may be a pure phase. In the present specification, the expression "pure phase" or "pure" denotes that a phase of an impurity is not detected in an X-ray powder diffractogram (XRD). Pure cubic phase $Li_xLa_3M_2O_{12}$ may not include $Li_xLa_3M_2O_{12}$ having a tetragonal phase and a material other than $Li_xLa_3M_2O_{12}$. The $Li_xLa_3M_2O_{12}$ having a cubic phase may have higher ionic conductivity than the tetragonal phase $Li_xLa_3M_2O_{12}$. Accordingly, the oxide-based solid electrolyte of the present invention may exhibit high ionic conductivity.

The oxide-based solid electrolyte of the present invention may include a first dopant substituted into a lithium element site and a second dopant substituted into a metal element (M) site. A lithium element of the oxide-based solid electrolyte ($Li_xLa_3M_2O_{12}$) may be more easily substituted with the first dopant as the first dopant has a size similar to the lithium element. With respect to the oxide-based solid electrolyte in which the lithium elements are substituted with a predetermined amount of the first dopant, pure cubic phase $Li_xLa_3M_2O_{12}$ may be prepared. The added amount of the first dopant precursor required for forming pure cubic phase $Li_xLa_3M_2O_{12}$ may be increased as the second dopant is substituted into the metal element site. For example, the first dopant precursor may be added to the intermediate so that the first dopant is included in an amount of about 0.82 mol % to about 1.64 mol % based on the oxide-based solid electrolyte (cubic phase $Li_xLa_3M_2O_{12}$). The second dopant precursor may be added to the intermediate so that the second dopant is included in an amount of about 0.41 mol % to about 0.82 mol % based on the oxide-based solid electrolyte (cubic phase $Li_xLa_3M_2O_{12}$).

The lithium element may be volatized in the crystallization process. In the above-described step S10, the lithium compound may be excessively added in a stoichiometric amount of about 10% more than the amount of the lithium element included in the oxide-based solid electrolyte. Accordingly, the oxide-based solid electrolyte expressed by $Li_xLa_3M_2O_{12}$ may be prepared. The added amount of the lithium element required for forming cubic phase $Li_xLa_3M_2O_{12}$ may be further increased due to the first and second dopant precursors.

The oxide-based solid electrolyte having a cubic phase may be formed under a low temperature condition due to the first dopant and the second dopant. Accordingly, the oxide-based solid electrolyte may be easily prepared. For example, the heat treatment of the intermediate may be performed in a temperature range of about 800° C. to about 1,000° C. In the case that the intermediate is heat treated at a temperature lower than 800° C., the oxide-based solid electrolyte of the present invention (pure cubic phase $Li_xLa_3M_2O_{12}$) may not be formed. For example, $La_2O_3$, $LiO_2$, $ZrO_2$, and/or $La_2Zr_2O_7$ may be formed, or tetragonal phase $Li_xLa_3M_2O_{12}$ may be formed. In the case in which the intermediate is heat treated at a temperature higher than 1,000° C., the lithium element included in the intermediate may be volatized. In this case, the product may be another material (e.g., $La_2Zr_2O_7$) other than $Li_xLa_3M_2O_{12}$. The oxide-based solid electrolyte having a cubic phase may be formed in a short period of time due to the first dopant and the second dopant. The heat treatment of the intermediate may be performed for about 3 hours to about 4 hours. Accordingly, the oxide-based solid electrolyte may be easily prepared. In the case that the heat treatment is performed for less than 3 hours, the intermediate may not be sufficiently crystallized. As a result, the product may have a tetragonal phase or amorphous structure, or impurities (e.g., $La_2O_3$, $LiO_2$, $ZrO_2$, and/or $La_2Zr_2O_7$) may be formed. In the case in which the heat treatment is performed for greater than 4 hours, the lithium element included in the intermediate may be volatized and an impurity, such as $La_2Zr_2O_7$, may be formed. Accordingly, the oxide-based solid electrolyte may be prepared in a low yield.

The lithium element, lanthanide element, metallic element, and oxygen element may be uniformly distributed in the oxide-based solid electrolyte by the mixing process described in S10. Accordingly, the oxide-based solid electrolyte may be prepared to have higher purity.

The oxide-based solid electrolyte may have various shapes. For example, the oxide-based solid electrolyte may be prepared in the form of a pellet. However, the shape or size of the oxide-based solid electrolyte is not limited thereto, and may be various. The shape or size of the oxide-based solid electrolyte may be controlled to be suitable for the application of a lithium battery. For example, the shape of the intermediate is controlled and the crystallization process of the intermediate may then be performed. As another example, the crystallization process of the intermediate is performed, and the shape of the oxide-based solid electrolyte may then be controlled. Since the oxide-based solid electrolyte of the present invention is prepared in the state of solid powder, the shape or size of the oxide-based solid electrolyte may be easily controlled.

Hereinafter, the preparation of the oxide-based solid electrolyte of the present invention and the results of the characterization of the oxide-based solid electrolyte will be described in more detail with reference to experimental examples of the present invention.

Preparation of Oxide-Based Solid Electrolyte

Experimental Example 1

Lithium carbonate ($LiCO_3$), lanthanum oxide ($La_2O_3$), and zirconium oxide ($ZrO_2$) were prepared in a powder state so that lithium (Li), lanthanum (La), and zirconium (Zr) had a stoichiometric ratio of 7:3:2. Aluminum oxide ($Al_2O_3$) was used as a first dopant precursor and tantalum oxide ($Ta_2O_5$) was used as a second dopant precursor. Aluminum oxide was prepared so that an aluminum element was included in an amount of 0.82 mol % based on an oxide-based solid electrolyte ($Li_7La_3Zr_2O_{12}$) as a final product. Tantalum oxide was prepared so that a tantalum element was included in an amount of 0.41 mol % based on the oxide-based solid electrolyte ($Li_7La_3Zr_2O_{12}$) as the final product. The lithium carbonate, lanthanum oxide, zirconium oxide, aluminum oxide, and tantalum oxide were mixed for 12 hours by a ball milling method to prepare an intermediate. In this case, isopropyl alcohol was further added to the lithium carbonate, lanthanum oxide, zirconium oxide, and aluminum oxide. After ball milling, the prepared intermediate was dried at 100° C. in an oven. The intermediate was heat treated at 1,000° C. for 4 hours in a reaction furnace. The oxide-based solid electrolyte was ground.

Experimental Example 2

An oxide-based solid electrolyte was prepared in the same manner as in Experimental Example 1 except that an amount of aluminum oxide added in the present experimental example was adjusted so that an aluminum element was included in an amount of 1.23 mol % based on the oxide-based solid electrolyte as a final product.

Experimental Example 3

An oxide-based solid electrolyte was prepared in the same manner as in Experimental Example 1 except that an amount of aluminum oxide added in the present experimental example was adjusted so that an aluminum element was included in an amount of 1.64 mol % based on the oxide-based solid electrolyte as a final product. The amounts of the aluminum oxide, tantalum oxide, and lithium carbonate added in Experimental Examples 1 to 3 are presented below.

TABLE 1

|  | Amount of first dopant added based on $Li_7La_3Zr_2O_{12}$ (mol %) | Amount of second dopant added based on $Li_7La_3Zr_2O_{12}$ (mol %) | Amount of lithium element added based on $Li_7La_3Zr_2O_{12}$ (mol %) |
| --- | --- | --- | --- |
| Experimental Example 1 | 0.82 | 0.41 | 29.2 |
| Experimental Example 2 | 1.23 | 0.41 | 29.2 |
| Experimental Example 3 | 1.64 | 0.41 | 29.2 |

Comparative Examples

Lithium carbonate, lanthanum oxide, and zirconium oxide were prepared in a powder state. The lanthanum oxide and zirconium oxide were prepared so that La and Zr had a stoichiometric ratio of 3:2. Lithium carbonate, lanthanum oxide, zirconium oxide, aluminum oxide, and tantalum oxide were mixed to prepare an intermediate. In this case, the presence and amount of the aluminum oxide, tantalum oxide, and lithium carbonate added were controlled as below. Isopropyl alcohol was further added to the intermediate. An oxide-based solid electrolyte of Comparative Example 1 was prepared by the same ball milling method and heat treatment process as described in Experimental Example 1.

TABLE 2

|  | Amount of first dopant added based on $Li_7La_3Zr_2O_{12}$ (mol %) | Amount of second dopant added based on $Li_7La_3Zr_2O_{12}$ (mol %) | Amount of lithium element added based on $Li_7La_3Zr_2O_{12}$ (mol %) |
| --- | --- | --- | --- |
| Comparative Example 1 | 0 | 0 | 29.2 |
| Comparative Example 2 | 0 | 0.41 | 29.2 |
| Comparative Example 3 | 0.41 | 0 | 29.2 |
| Comparative Example 4 | 0.82 | 0 | 29.2 |
| Comparative Example 5 | 1.23 | 0 | 29.2 |
| Comparative Example 6 | 1.64 | 0 | 29.2 |
| Comparative Example 7 | 2.05 | 0 | 29.2 |
| Comparative Example 8 | 0.41 | 0.41 | 29.2 |
| Comparative Example 9 | 2.05 | 0.41 | 29.2 |
| Comparative Example 10 | 1.23 | 0 | 28.3 |
| Comparative Example 11 | 1.23 | 0 | 30.0 |
| Comparative Example 12 | 1.23 | 0.41 | 27.7 |
| Comparative Example 13 | 1.23 | 0.41 | 30.9 |

Characterization of Solid Electrolyte

1. Preparation of Oxide-Based Solid Electrolyte Pellet

The ground oxide-based solid electrolyte was provided in a mold. The oxide-based solid electrolyte was prepared in the form of a pellet by pressing the mold. The oxide-based solid electrolyte pellet had a diameter of 18 mm and a thickness of 2 mm.

2 Impedance Evaluation

Cells were prepared by coating both sides of the pellets of the oxide-based solid electrolytes prepared in Experimental Example 2 and Comparative Example 5 with copper electrodes having a thickness of 6 μm. Electrical conductivities of the oxide-based solid electrolytes were measured using a frequency response analyzer (Solartron HF 1225). The measurement of the electrical conductivity of the oxide-based solid electrolyte was performed by applying alternating current (AC) impedance in a frequency range of $10^{-1}$ Hz to $10^5$ Hz to the cells.

Figure 2:
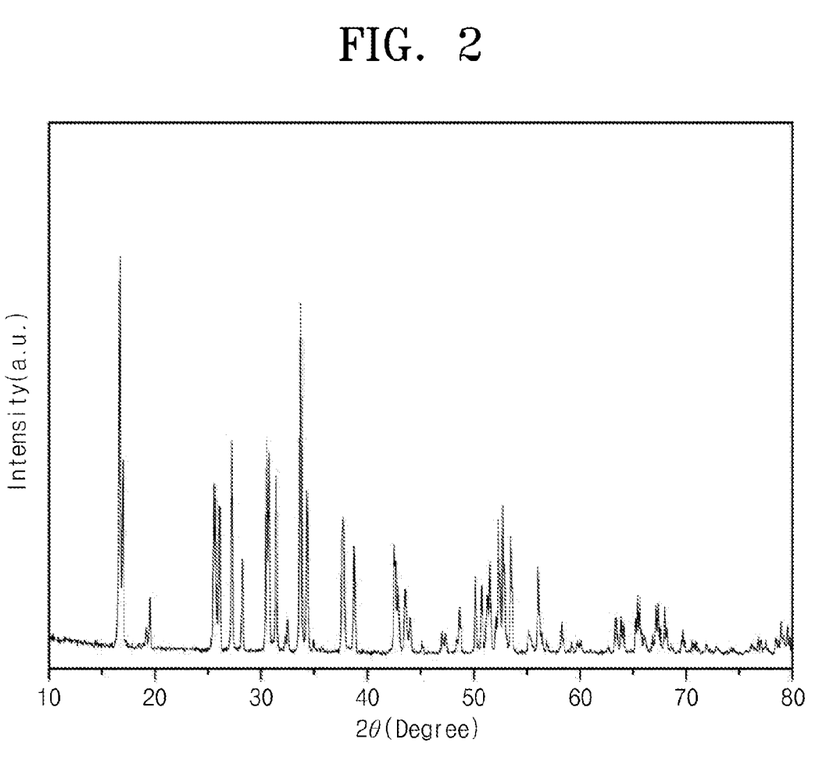
FIG. 2 is a graph illustrating the results of X-ray diffraction analysis of Comparative Example 1.
Figure 3:
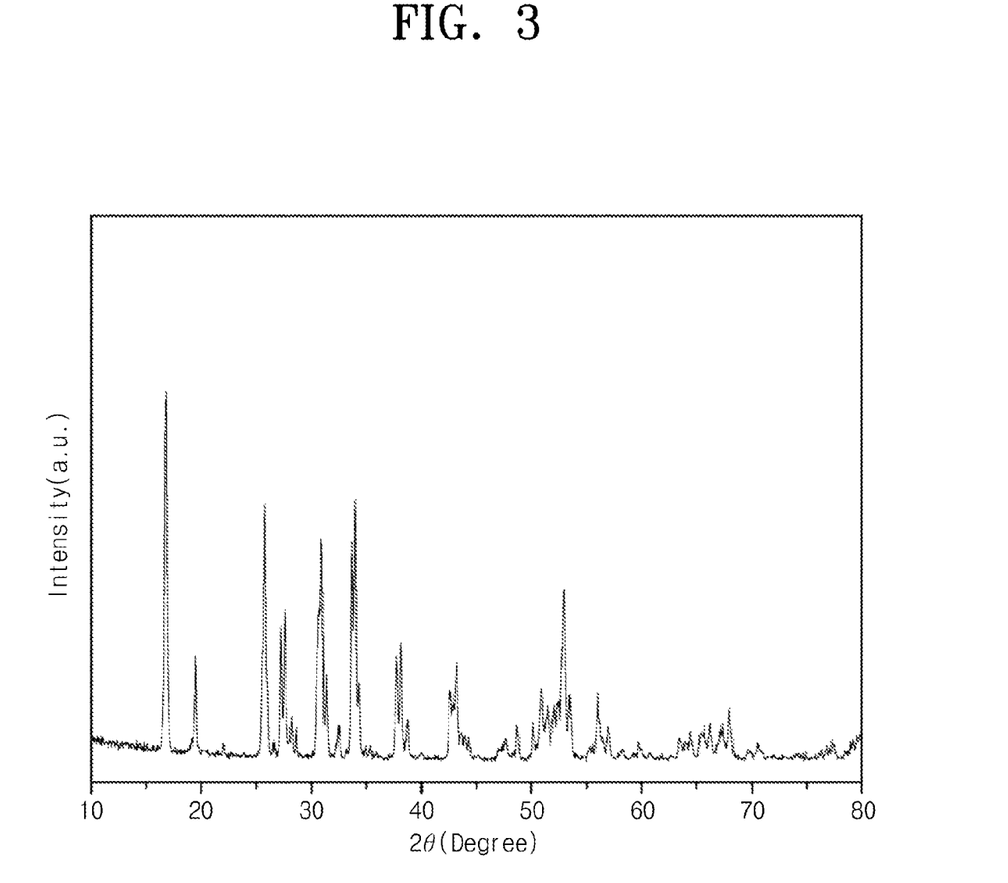
FIG. 3 is a graph illustrating the results of X-ray diffraction analysis of Comparative Example 2.
Figure 4:
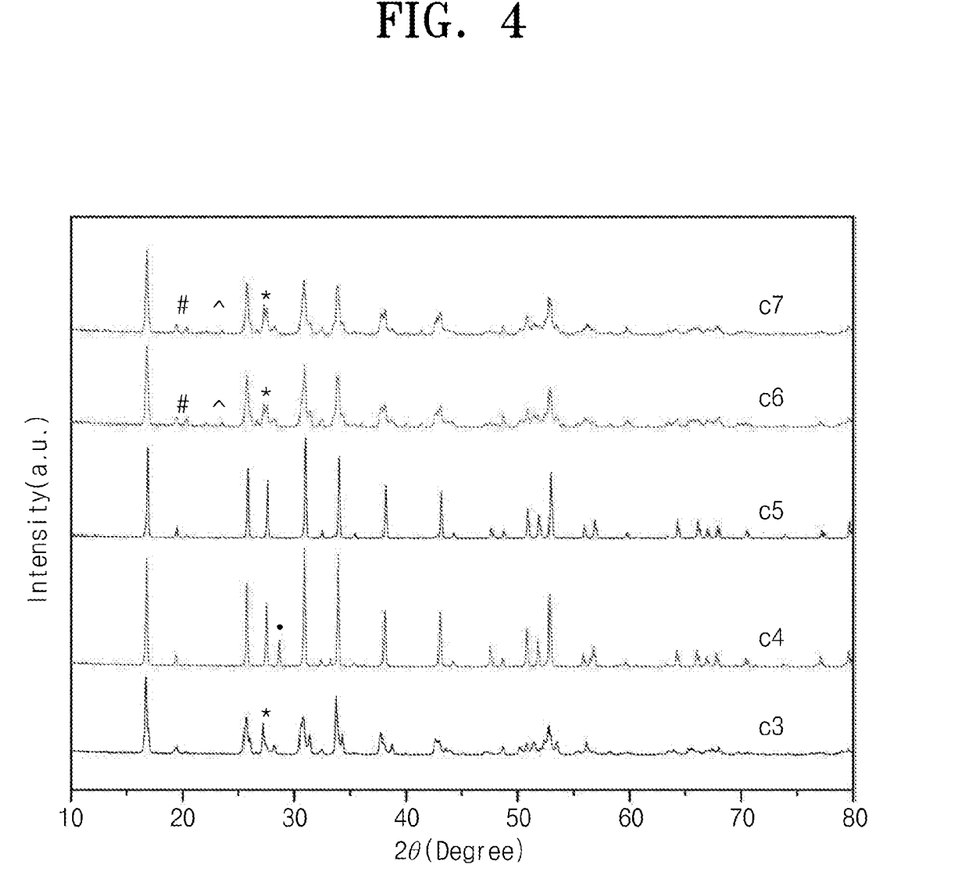
FIG. 4 is a graph illustrating the results of X-ray diffraction analysis of Comparative Examples 3 to 7.

FIG. 2 is a graph illustrating the results of X-ray diffraction analysis of Comparative Example 1, FIG. 3 is a graph illustrating the results of X-ray diffraction analysis of Comparative Example 2, and FIG. 4 is a graph illustrating the results of X-ray diffraction analysis of Comparative Examples 3 to 7. In FIG. 4, c3 to c7 were the analysis results of Comparative Examples 3 to 7, respectively.

Referring to FIG. 2, it may be understood that Comparative Example 1 included tetragonal phase $Li_7La_3Zr_2O_{12}$ as well as cubic phase $Li_7La_3Zr_2O_{12}$. According to the analysis result of Comparative Example 1, tetragonal phase $Li_7La_3Zr_2O_{12}$ peaks were observed at 2θ of 17°, 19°, 26°, and 31.5°, respectively.

Referring to FIG. 3, it may be understood that Comparative Example 2 included tetragonal phase $Li_7La_3Zr_2O_{12}$ as well as cubic phase $Li_7La_3Zr_2O_{12}$. According to the analysis result of Comparative Example 2, a tetragonal phase $Li_7La_3Zr_2O_{12}$ peak was observed at 2θ of 31.5°. As observed in FIGS. 2 and 3, in the case that the first dopant precursor was not used, tetragonal phase $Li_7La_3Zr_2O_{12}$ may be further formed. That is, pure cubic phase $Li_7La_3Zr_2O_{12}$ may be difficult to be formed.

Referring to FIG. 4, it may be identified that Comparative Example 5 (c5) using 1.23 mol % of the first dopant precursor included pure cubic phase $Li_7La_3Zr_2O_{12}$. However, comparative examples (c3, c4, c6, and c7) excluding Comparative Example 5 exhibited impurity peaks (*, ˆ, •, and #) as well as $Li_7La_3Zr_2O_{12}$ peaks. That is, the oxide-based solid electrolytes of the comparative examples included non-cubic phase $Li_7La_3Zr_2O_{12}$, or further included a material other than $Li_7La_3Zr_2O_{12}$. For example, Comparative Example 3 (c3) exhibited a tetragonal phase $Li_7La_3Zr_2O_{12}$ peak (*). Comparative Example 4 (c4) exhibited a $La_2Zr_2O_{12}$ peak (•). Comparative Examples 6 (c6) and 7 (c7) exhibited $ZrO_2$ peaks (#), $La_2Al_2O_{12}$ peaks (ˆ), and tetragonal phase $Li_7La_3Zr_2O_{12}$ peaks (*). When only the first dopant precursor was used, the added amount of the first dopant precursor required for forming pure cubic phase $Li_7La_3Zr_2O_{12}$ may be relatively decreased.

Figure 5:
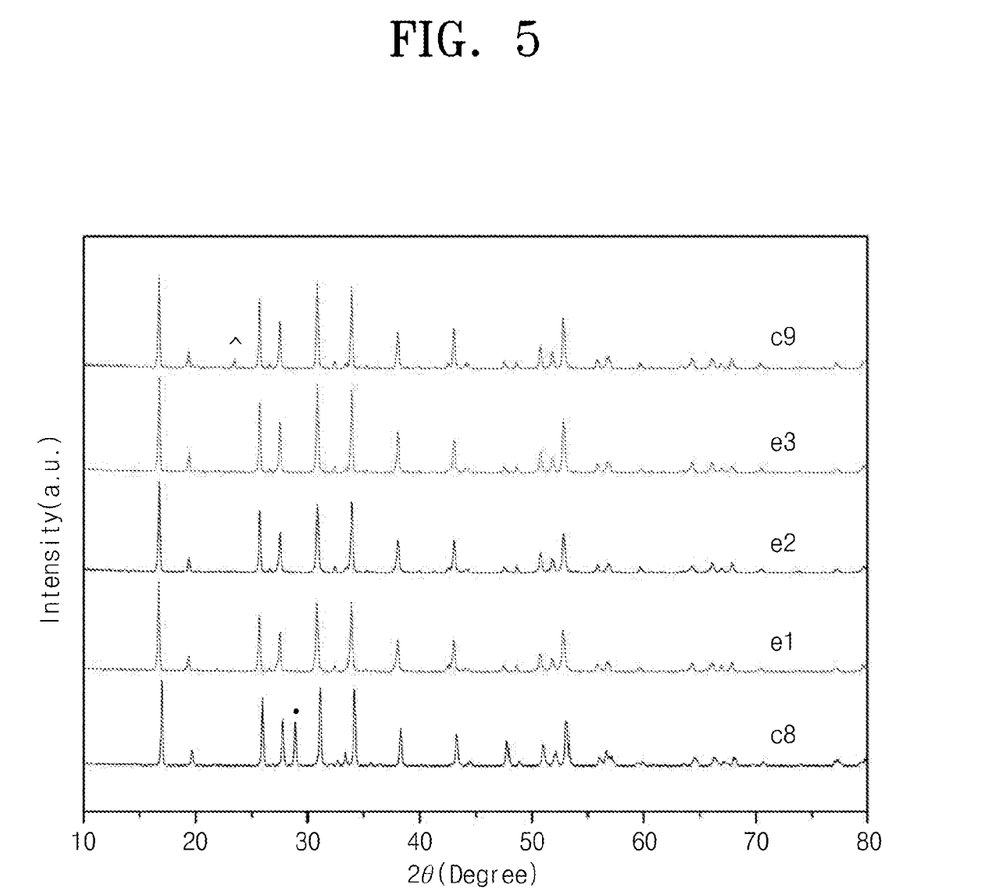
FIG. 5 is a graph illustrating the results of X-ray diffraction (XRD) analysis of comparative examples and experimental examples.

FIG. 5 is a graph illustrating the results of X-ray diffraction (XRD) analysis of comparative examples and experimental examples. c8 and c9 were respectively the analysis results of Comparative Examples 8 and 9, and e1 to e3 were respectively the analysis results of Experimental Examples 1 to 3.

Referring to FIG. 5, the oxide-based solid electrolytes of the experimental examples (e1, e2, and e3) exhibited pure cubic phase $Li_7La_3Zr_2O_{12}$ peaks. The comparative examples (c8 and c9) exhibited impurity peaks (• and ˆ) in addition to cubic phase $Li_7La_3Zr_2O_{12}$ peaks. For example, Comparative Example 8 (c8) exhibited a $La_2Zr_2O_{12}$ peak (•), and Comparative Example 9 (c9) exhibited a $La_2Al_2O_{12}$ peak (ˆ). According to the present invention, the oxide-based solid electrolyte may be prepared by using both first dopant precursor and second dopant precursor. The added amount of the first dopant precursor required for forming pure cubic phase $Li_xLa_3M_2O_{12}$ may be increased by using the second dopant precursor. For example, in the case that the first dopant was included in an amount of 0.82 mol % to 1.64 mol % based on the oxide-based solid electrolyte, pure cubic phase $Li_7La_3Zr_2O_{12}$ may be formed. Accordingly, the pure cubic phase $Li_7La_3Zr_2O_{12}$ may be more easily prepared.

Figure 6:
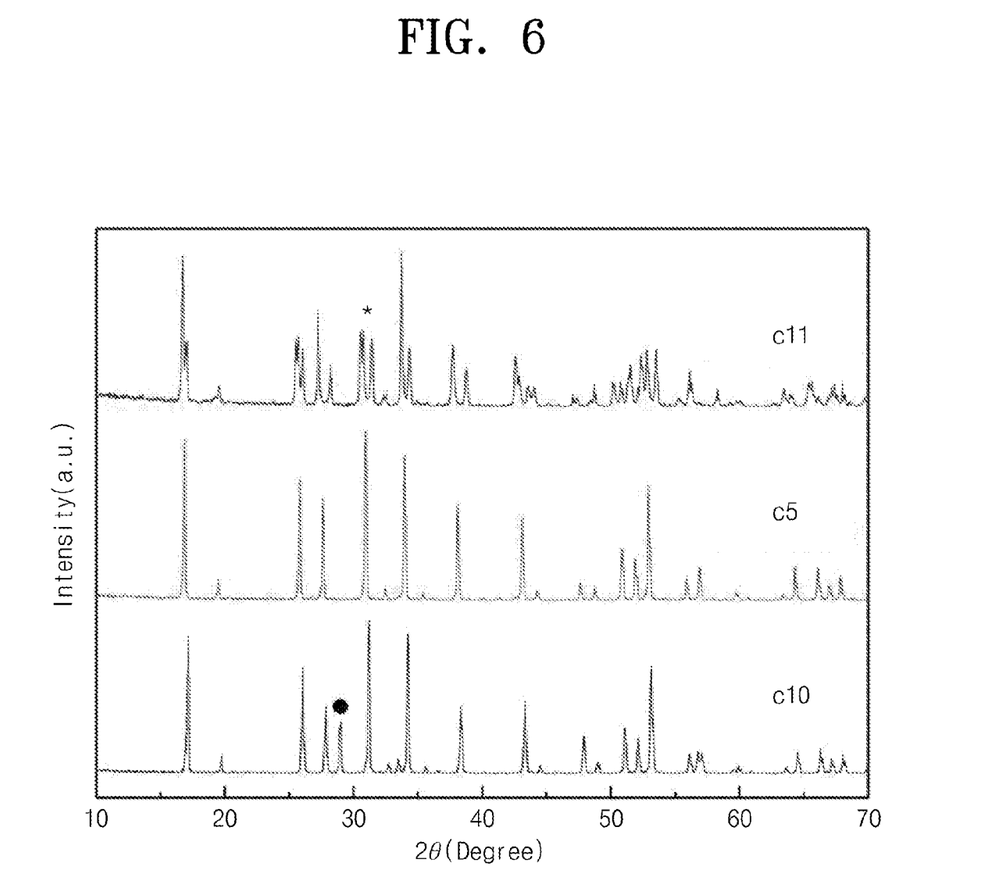
FIG. 6 is a graph illustrating the results of X-ray diffraction analysis of Comparative Examples 5, 10, and 11 having different amounts of lithium.
Figure 7:
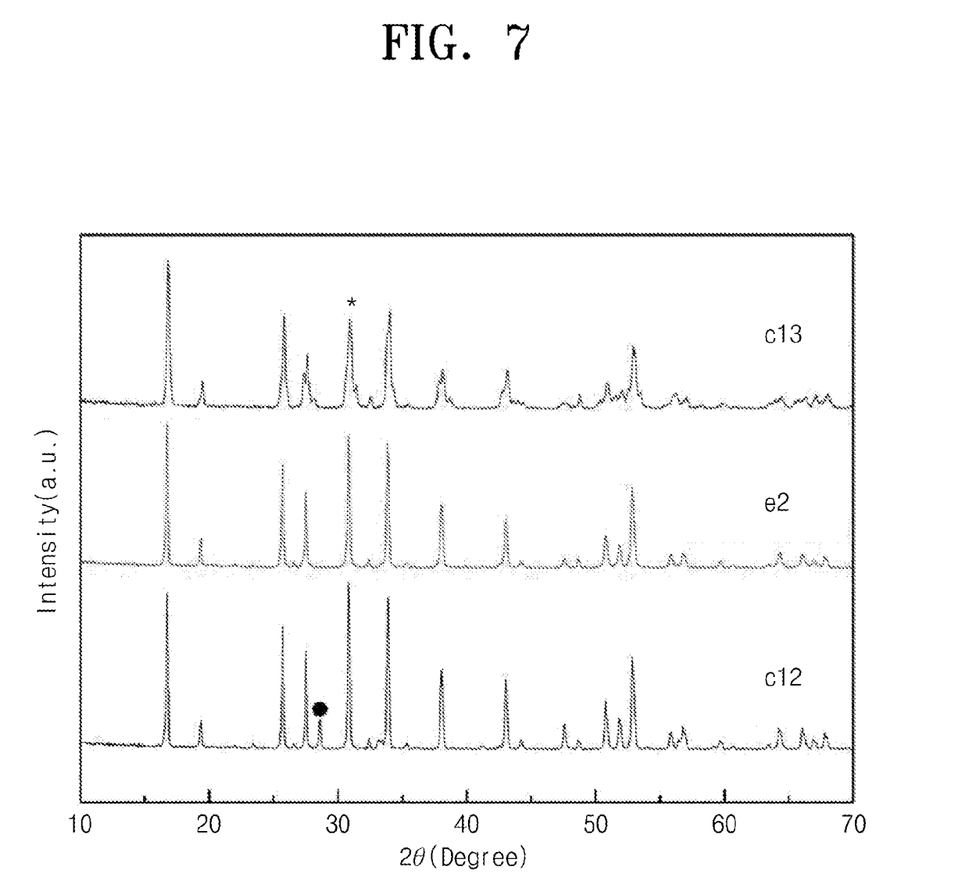
FIG. 7 is a graph illustrating the results of X-ray diffraction analysis of Experimental Example 5 and Comparative Examples 12 and 13 having different amounts of lithium.

FIG. 6 is a graph illustrating the results of X-ray diffraction analysis of comparative examples having different amounts of lithium, and FIG. 7 is a graph illustrating the results of X-ray diffraction analysis of experimental example and comparative examples having different amounts of lithium. In FIG. 6, c10, c5, and c11 were the analysis results of Comparative Examples 10, 5, and 11, respectively. In FIG. 7, c12, e2, and c13 were the analysis results of Comparative Example 12, Experimental Example 2, and Comparative Example 13, respectively.

Referring to FIG. 6, in the case that the amount of the lithium element was relatively low, it may be understood that pure cubic phase $Li_7La_3Zr_2O_{12}$ was formed. For example, in the case in which the amount of the lithium element was greater than 28.3 mol % and less than 30.0 mol % based on the oxide-based solid electrolyte, pure cubic phase $Li_7La_3Zr_2O_{12}$ may be formed. The oxide-based solid electrolyte of Comparative Example 5 (c5) may have 29.2 mol % of the lithium element and may be pure cubic phase $Li_7La_3Zr_2O_{12}$. Comparative Example 10 (c10) exhibited a $La_2Zr_2O_{12}$ peak (•), and Comparative Example 11 (c11) exhibited a tetragonal phase $Li_7La_3Zr_2O_{12}$ peak (*).

Referring to FIG. 7 together with FIG. 6, in the case that the amount of the lithium element was greater than 27.7 mol % and less than 30.9 mol % based on the oxide-based solid electrolyte, pure cubic phase $Li_7La_3Zr_2O_{12}$ may be formed. For example, Experimental Example 2 (e2) may exhibit a $Li_7La_3Zr_2O_{12}$ peak of a pure cubic phase which did not include impurities. Comparative Example 12 (c12) exhibited a $La_2Zr_2O_{12}$ peak (•), and Comparative Example 13 (c13) exhibited a tetragonal phase $Li_7La_3Zr_2O_{12}$ peak (*). Since the oxide-based solid electrolyte of the present invention was prepared by further using the second dopant precursor, the amount of the lithium element required for forming pure cubic phase $Li_7La_3Zr_2O_{12}$ may be more increased. According to the present invention, pure cubic phase $Li_7La_3Zr_2O_{12}$ may be more easily prepared.

Figure 8:
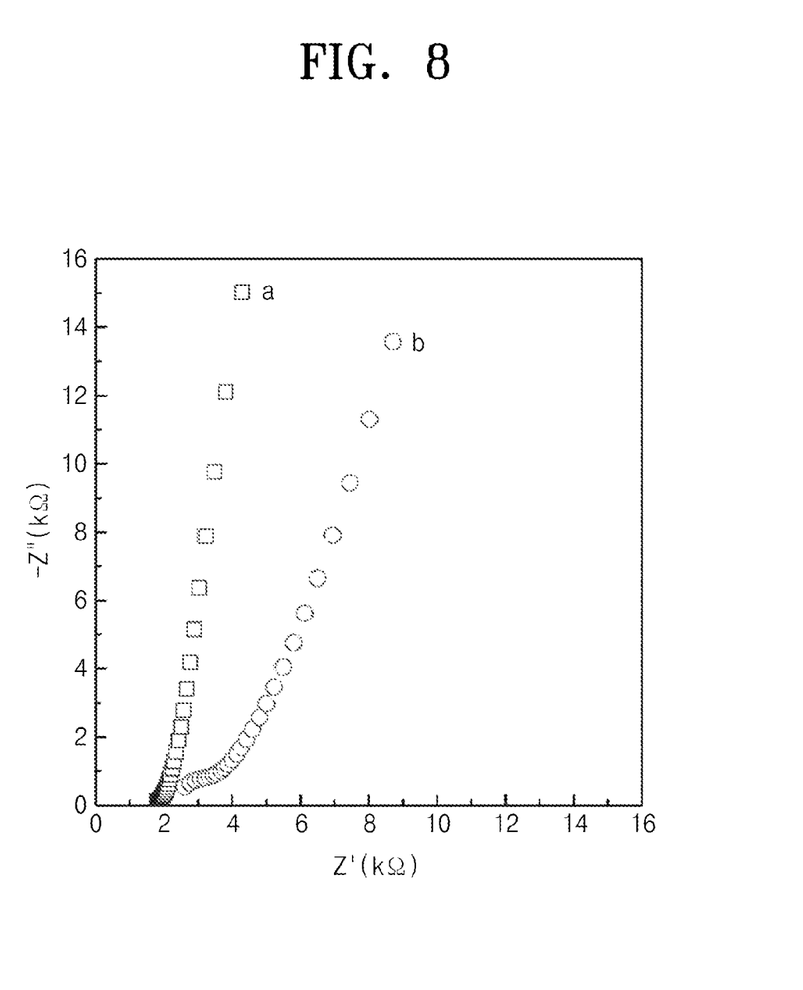
FIG. 8 illustrates the evaluation results of impedance characteristics of Comparative Example 5 and Experimental Example 2.

FIG. 8 illustrates the evaluation results of impedance characteristics of Comparative Example 5 and Experimental Example 2. "a" represents impedance evaluation results of Comparative Example 5 and "b" represents impedance evaluation results of Experimental Example 2.

Referring to FIG. 8, it may be confirmed that Experimental Example 2 exhibited higher ionic conductivity than Comparative Example 5. For example, the ionic conductivities of Comparative Example 5 and Experimental Example 2 may be calculated from the impedance evaluation results. Comparative Example 5 may have an ionic conductivity of about $1.8 \times 10^{-4}$ S/m, and Experimental Example 2 may have an ionic conductivity of about $2.9 \times 10^{-4}$ S/m. Since the oxide-based solid electrolyte of the present invention was prepared by further using the second dopant precursor, the oxide-based solid electrolyte of the present invention may exhibit more improved ionic conductivity.

An oxide-based solid electrolyte of the present invention may be prepared by using first and second dopant precursors. The oxide-based solid electrolyte may include $Li_xLa_3M_2O_{12}$ crystals and may have a cubic phase. The first dopant precursor may be used to prevent the oxide-based solid electrolyte from having other crystal structures or having other impurities formed therein. The cubic-phase oxide-based solid electrolyte expressed by $Li_xLa_3M_2O_{12}$ may be prepared to have high purity by controlling the amount of the first dopant added. The added amount of the first dopant precursor required for forming pure cubic-phase $Li_xLa_3M_2O_{12}$ may be further increased by using the second dopant precursor. The added amount of a lithium element required for forming cubic-phase $Li_xLa_3M_2O_{12}$ may be further increased due to the first and second dopant precursors. The oxide-based solid electrolyte prepared according to the present invention may have high purity and high ionic conductivity. A crystallization process of the oxide-based solid electrolyte may be performed under conditions of a lower temperature and a shorter time by using the first and second dopant precursors. Accordingly, the oxide-based solid electrolyte may be more easily prepared.

While preferred embodiments of the present invention has been particularly shown and described with reference to the accompanying drawings, it will be understood by those of ordinary skill in the art that various changes in form and details may be made therein without departing from the spirit and scope of the present invention as defined by the following claims.

What is claimed is:

1. A method of preparing an oxide-based solid electrolyte, the method comprising:
    mixing a lithium compound, a lanthanum compound, a metal compound, a first dopant precursor, and a second dopant precursor to prepare an intermediate; and
    crystallizing the intermediate to prepare $Li_xLa_3M_2O_{12}$ crystals having a cubic phase (where x is 5 or 7, and M is any one selected from the group consisting of tantalum, niobium, and zirconium).

2. The method of claim 1, wherein the first dopant precursor is a salt comprising a first dopant, and
    the first dopant comprises any one selected form the group consisting of aluminum, germanium, silicon, gallium, indium, tin, and antimony.

3. The method of claim 2, wherein the first dopant precursor is added to the intermediate so that the first dopant is present in a stoichiometric amount of 0.82 mol % to 1.64 mol % based on the $Li_xLa_3M_2O_{12}$ crystals.

4. The method of claim 1, wherein the second dopant comprises any one selected from the group consisting of tantalum, niobium, and zirconium,
    wherein the second dopant comprises a material that is different from a metal included in the metal compound.

5. The method of claim 4, wherein the second dopant precursor is added to the intermediate so that the second dopant is present in a stoichiometric amount of 0.41 mol % to 0.82 mol % based on the $Li_xLa_3M_2O_{12}$ crystals.

6. The method of claim 1, wherein the crystallizing of the intermediate comprises not forming $Li_xLa_3M_2O_{12}$ having a tetragonal phase and a material different from the $Li_xLa_3M_2O_{12}$.

7. The method of claim 1, wherein the crystallizing of the intermediate comprises heat treating the intermediate in a temperature range of 800° C. to 1,000° C. for 3 hours to 4 hours.

8. The method of claim 1, wherein M is zirconium, and
    the preparing of the intermediate comprises providing the lithium compound so that lithium included in the lithium compound is in an amount greater than 27.7 mol % and less than 30.9 mol % based on the $Li_xLa_3M_2O_{12}$ crystals.

9. The method of claim 1, wherein M is tantalum, and
    the preparing of the intermediate comprises providing the lithium compound so that lithium included in the lithium compound is in an amount greater than 26.8 mol % and less than 27.7 mol % based on the $Li_xLa_3M_2O_{12}$ crystals.

10. An oxide-based solid electrolyte comprising:
    $Li_xLa_3M_2O_{12}$ crystals having a cubic phase;
    a first dopant included in the $Li_xLa_3M_2O_{12}$ crystals; and
    a second dopant included in the $Li_xLa_3M_2O_{12}$ crystals,
    wherein the first dopant is included in an amount of 0.82 mol % to 1.64 mol % based on the $Li_xLa_3M_2O_{12}$ crystals, and
    the second dopant is included in an amount of 0.41 mol % to 0.82 mol % based on the $Li_xLa_3M_2O_{12}$ crystals
    (where x is 5 or 7, and M is any one selected from the group consisting of tantalum, niobium, and zirconium).

11. The oxide-based solid electrolyte of claim 10, wherein the first dopant comprises any one selected form the group consisting of aluminum, germanium, silicon, gallium, indium, tin, and antimony.

12. The oxide-based solid electrolyte of claim 10, wherein the second dopant comprises any one selected from the group consisting of tantalum, niobium, and zirconium,
    wherein the second dopant comprises a material that is different from M of the $Li_xLa_3M_2O_{12}$ crystals.

* * * * *